Sept. 17, 1963
E. J. CATOR
3,104,088
QUICK CONNECT COUPLING
Filed Sept. 27, 1960
Fig.1
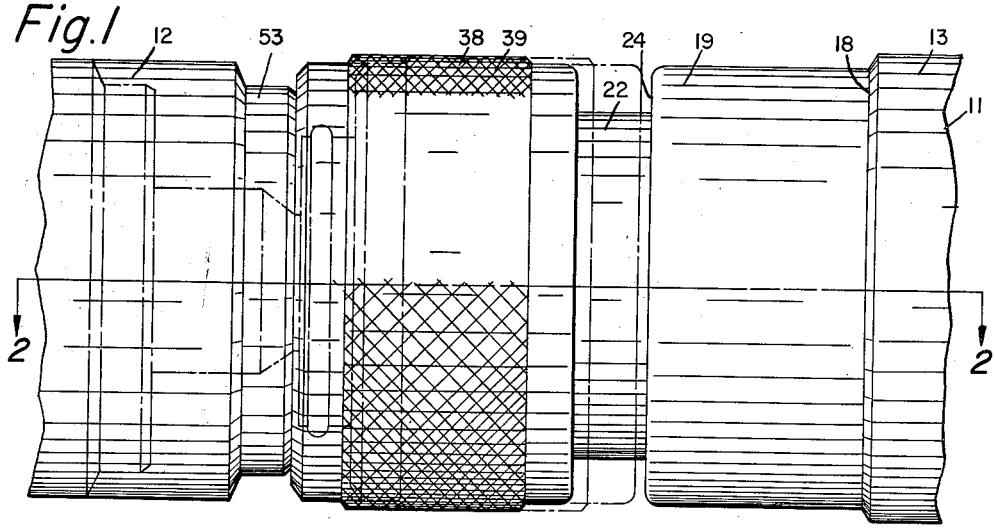
Fig.2
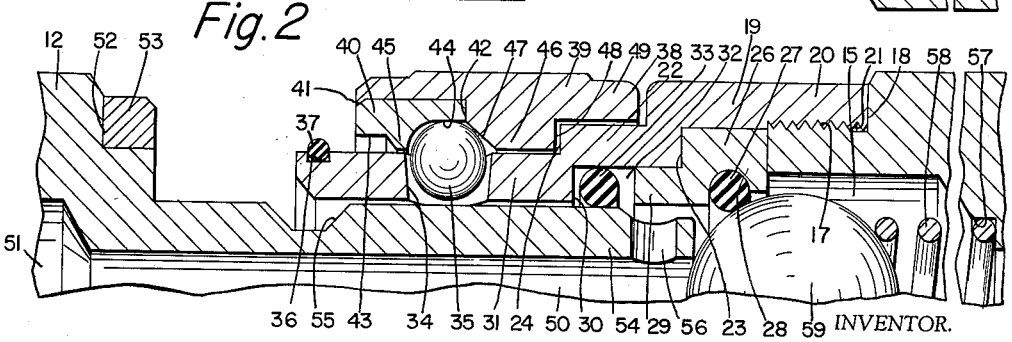
Fig. 3
INVENTOR.
EDWARD J. CATOR
BY
*Jay & Jay*
ATTORNEYS

United States Patent Office 3,104,088
Patented Sept. 17, 1963

3,104,088
QUICK CONNECT COUPLING
Edward J. Cator, Rochester, N.Y., assignor to Crawford Fitting Company, Cleveland, Ohio, a corporation of Ohio
Filed Sept. 27, 1960, Ser. No. 58,714
8 Claims. (Cl. 251—149.6)

This invention relates to snap-action couplings, particularly such couplings employing magnets.

It is an object of this invention to provide snap-action couplings which shall be simple in design and so constructed as to obviate springs commonly used in such couplings.

A further object is to provide snap-action couplings which shall utilize permanent magnets in their construction and thus eliminate instability, fatigue and breakage of springs commonly used in such couplings.

A further object is to provide couplings of the character indicated which shall contain relatively few parts, be easily operated, and quickly assembled and disassembled.

A further object is to provide magnetic couplings which shall embody a shut-off valve.

A further object is to provide couplings of the character noted immediately above in which sealing of the fluid line is obtained prior to opening of the valve and closing of the valve takes place before the sealing of the fluid line is broken.

Other objects and advantages of the invention will be apparent from the following description of a preferred form of the invention, reference being made to the accompanying drawings wherein:

FIG. 1 is an outside view of a coupling embodying the instant invention;

FIG. 2 is a longitudinal section taken on the line 2—2 of FIG. 1 showing the parts coupled, and FIG. 3 is a view similar to FIG. 2 showing the parts uncoupled.

In the drawings, the coupling embodying my invention is designated in its entirety by the reference numeral 10. The coupling 10 comprises a female member 11 and a male member 12. In the illustrated embodiment, the female member 11, which is made of non-magnetic material such as aluminum, brass, austenetic steel or the like, is formed of a non-magnetic body member 13 internally bored as indicated at 14 and 15, the bore 15 being larger in diameter than the bore 14. The forward portion 16 of the body member is threaded as shown at 17 and is thinner than the adjacent portion thereby providing a shoulder 18 which is adapted to serve as a stop for a non-magnetic collar 19 mounted upon the body member 13.

The outer portion 20 of the collar 19 is threaded as shown at 21 for engagement with the threads 17 of the body member, such engagement being limited by the shoulder 18. Forwardly of the threaded portion 20, the collar is inset to provide an intermediate portion 22 which forms an internal shoulder 23 and an external shoulder 24. The internal shoulder 23 cooperates with the forward end of the body member 13 to provide a recess 25 within a non-magnetic member 26 is frictionally secured when the collar is threaded upon the body member. The member 26 serves to retain an O-ring seal 27 which is seated in a groove 28 formed in member 26.

The member 26 is provided with a portion 29 which extends forwardly in contact with the inset portion 22 and cooperates with a shoulder 30 formed by a second inset portion 31 extending forward from inset portion 22 to provide a groove 32 in which a second O-ring seal 33 is retained. Forwardly of the shoulder 30 the inset portion 31 of the collar 19 is formed with a plurality of tapered radial openings, one of which is shown at 34, in which ball detents as shown at 35, made of light magnetic material, are received. This material may be a high quality carbon steel, a martensitic stainless steel, or the like. Forwardly of the openings 34 and adjacent to the inner end of the collar, the inset portion 31 is provided with an annular groove 36 which receives a non-magnetic ring 37 adapted to engage and limit forward movement of a sleeve 38 slidably carried upon the collar 19.

The main body 39 of the sleeve 38 is formed of non-magnetic material. At its forward end, however, the main body 39 carries a magnetic insert 40 firmly retained in the body between the forward and rear shoulders 41 and 42 formed therein. This insert should have extremely high flux density and long life expectancy. The magnetic insert is undercut as shown at 43 and 44 to provide an inwardly extending portion 45 which engages the ring 37 to restrict forward movement of the sleeve 38. The undercut 44 is preferably curved to substantially follow the contour of the ball detents 35.

From the shoulder 42 the inner face of the main body 39 of the sleeve inclines inwardly and rearwardly, then rearwardly, then outwardly and then rearwardly to provide a portion 46 having shoulders 47 and 48 and a rearwardly extending portion 49 which overlaps the inset portion 22 of the collar 19. The portion 46 serves to confine the ball detents 35 in the openings 34 of the collar. The inclined shoulder 47 acts to force the detents 35 into a hereinafter described annular groove provided in the male member which the shoulder 46 and the rear edge of the portion 49 of the sleeve may function to limit rearward movement of the sleeve upon the collar 19.

The male member 12 is provided with a forward central bore 50 which communicates with a rear central bore 51 of larger diameter. The member 12 is formed with an external annular groove 52 within which a magnetic insert 53 having a polarity opposite from that of the insert 40 is firmly mounted, as by press-fitting or other suitable retaining means.

The portion 54 of the male member which extends forwardly from the plane of the outer face of the insert 53 is of reduced thickness and is received within the female member 11 when the members are coupled. The portion 54 is formed with an external annular tapered detent receiving groove 55 spaced from the insert 53. Adjacent to the inner end of the male member, the portion 54 is formed with radial openings, one of which is shown at 56 and through which fluid may pass into the bore 15 of the female member.

An internal annular groove 57 is formed in the female member 11 adjacent to the smaller bore 14. This groove provides a shoulder which forms an abutment for one end of a helical spring 58 of a single-end shut-off valve. The other end of the spring bears against the ball 59 of the valve biasing it into sealing engagement with the O-ring seal 27 and preventing the passage of fluid between the male and female members.

In FIG. 1 of the drawing, the male and female members are shown coupled. In this relationship, the magnetic inserts 40 and 53 are attracted as a result of their opposite polarity and engage one another thereby so positioning the sleeve that the portion 46 thereof overlies the ball detents 35 and prevents their movement out of the annular groove 55 in the portion 54 of the male member. The male and female members are thus locked in coupled position.

In this position also the inner end of the portion 54 of the male member 12 has engaged the ball 59 of the shut-off valve and forced it out of engagement with the O-ring seal 27 against the force exerted by the spring 58. Open passage of fluid between the male and female members through the radial openings 56 is thus provided and at a time subsequent to the establishment of a fluid-tight seal between the male member 12 and the O-ring seal 33.

To uncouple the male and female members, the sleeve 38 is pushed rearwardly to break the force of attraction between the magnetic inserts 40 and 53, and position the undercut portion 44 and shoulder 47 above the openings in the inset portion 31 of the collar 19. The ball detents, which are slightly magnetic, are attracted by the magnetic insert 40 and move out of the annular detent receiving groove 55, whereupon the male member can be moved out of the female member. This movement of the male member may be aided by the pressure in the line and/or the pressure of the spring of the shut-off valve. During the outward movement of the male member, the ball 59 is biased forwardly by the spring 58 into sealing engagement with the O-ring seal, this engagement occuring prior to the disengagement of the male member from the O-ring seal 33.

To couple the male and female member, the former is inserted into the latter and moved rearwardly therein. Sealing engagement between the portion 54 of the male member 12 and the O-ring seal 33 is established. Continued movement of the male member in the same direction disposes the detent receiving groove 55 below the ball detents 35. At this time the force of attraction between the magnetic inserts 40 and 53 is of such magnitude as to pull the sleeve forward. During this movement, the inclined shoulder 47 on the sleeve forces the ball detents into the detent receiving groove 55. The magnetic inserts are engaged holding the sleeve in the position shown in FIG. 2 of the drawing where the portion 46 of the sleeve overlies the radial openings 34 and prevents the detents from moving out of the detent receiving groove.

During this movement of the male member, the end of the portion 54 engages and forces the ball 59 of the shut-off valve rearwardly against the force of the spring 58 and breaks the sealing engagement between the ball and the O-ring seal 27. The line between the male and female members is now open through the radial openings 56.

The presence of iron particles where my magnetic coupling is used does not reduce its efficacy. The very simplicity of the design of my coupling and the consequent ease and speed of disassembly, cleaning and reassembly do not inhibit its effective utilization where iron particles are present.

My invention utilizes a single sleeve and provides a positive lock insuring safe operation.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. A coupling comprising non-magnetic male and female members, said male member having an external annular groove and a magnetic insert, said female member having radial openings therein, slightly magnetic ball detents in said openings, and a slidable non-magnetic sleeve carried by said female member, a magnetic insert carried by said sleeve, said magnetic inserts facing one another, said latter magnetic insert being undercut, said sleeve having a portion adapted to overlie said radial openings in said female member to confine said ball detents therein, said latter portion having an outwardly and forwardly inclined shoulder cooperating with said undercut portion to provide a groove adapted to receive said ball detents.

2. A coupling as set forth in claim 1 wherein said male member is provided with a plurality of radial openings adjacent to its inner end.

3. A coupling as set forth in claim 1, wherein said female member includes a body and a collar engaged therewith, said collar has a first inset portion cooperating with said body to provide an internal groove, a non-magnetic insert is confined in said groove and sealing means is carried by said insert.

4. A coupling as set forth in claim 1, wherein said female member includes a body and a collar engaged therewith, said collar has an inset portion, a non-magnetic member extends inwardly from said collar in spaced relation to said inset portion and cooperates therewith to provide a groove, and sealing means seated in said groove adapted to engage said male member to form a fluid tight seal.

5. A coupling as set forth in claim 3, wherein said collar has a second inset portion extending forwardly from said first inset portion, said second inset portion cooperating with said insert to provide a second groove, and second sealing means seated in said second groove adapted to engage said male member to form a fluid tight seal.

6. A coupling comprising non-magnetic male and female members, said male member having an external annular groove, a magnetic insert of a first polarity, and a plurality of radial openings adjacent its inner end, said female member having radial openings therein, ball detents of ferromagnetic material in said openings, and valve and male member internal sealing means carried by said female member, a shut-off valve carried by said female member, said valve embodying a valve ball and a spring interposed between said valve ball and said female member for biasing said valve ball into fluid-tight engagement with said valve sealing means, a sliding non-magnetic sleeve carried by said female member, a magnetic insert of a second polarity carried by said sleeve and facing the magnetic insert of said male member, said sleeve being undercut and having a portion adapted to overlie said radial openings in said female member and annular groove on said male member to confine said ball detents therein when said valve ball is out of fluid-tight engagement with said valve sealing means, said latter portion having an outwardly and forwardly inclined shoulder portion cooperating with said undercut portion to provide a groove adapted to receive said ball detents when said valve ball is biased into fluid-tight engagement with said valve means.

7. A coupling comprising non-magnetic male and female members, said male member having an external annular groove and a magnetic insert, said female member having radial openings therein, slightly magnetic ball detents in said openings, slidable sleeve means carried by said female member, a first portion of said sleeve means being of non-magnetic material and a second portion of said sleeve means being of magnetic material, said second portion of said sleeve means facing the magnetic insert carried by said male member, one of said portions on said sleeve means being adapted to overlie said radial openings to confine said ball detents therein, said one portion having an outwardly extending inclined shoulder merging with an undercut portion on said sleeve means to provide a groove adapted to receive said ball detents when said sleeve means is moved with respect to said female member.

8. The coupling of claim 1 further including first and second sealing means carried by said female member, shut off valve means also carried by said female member, said shut off valve means including a spring biased ball adapted to seat on said first sealing means, said male member being in fluid tight engagement with said second sealing means and said ball being disengaged from said first sealing means when said members are in coupled relationship, said ball being biased into fluid tight engagement with said first sealing means prior to disengagement of said male member from said second sealing means in the uncoupling operation.

References Cited in the file of this patent

UNITED STATES PATENTS

| | | |
|---|---|---|
| 2,108,714 | Hirsch et al. | Feb. 15, 1938 |
| 2,177,278 | Hill et al. | Oct. 24, 1939 |
| 2,473,973 | Scheiwer | June 21, 1949 |
| 2,565,572 | Pangborn | Aug. 28, 1951 |

FOREIGN PATENTS

| | | |
|---|---|---|
| 272,663 | Switzerland | Mar. 15, 1951 |
| 554,885 | Italy | Jan. 16, 1957 |
| 587,085 | Germany | Oct. 30, 1933 |